(12) United States Patent
Nagasaka et al.

(10) Patent No.: US 7,403,657 B2
(45) Date of Patent: Jul. 22, 2008

(54) METHOD AND APPARATUS FOR CHARACTER STRING SEARCH IN IMAGE

(75) Inventors: Akio Nagasaka, Kodaira (JP); Takafumi Miyatake, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 923 days.

(21) Appl. No.: 10/026,711

(22) Filed: Dec. 27, 2001

(65) Prior Publication Data

US 2002/0136458 A1 Sep. 26, 2002

(30) Foreign Application Priority Data

Mar. 22, 2001 (JP) ............................. 2001-082012

(51) Int. Cl.
*G06K 9/62* (2006.01)
*G06K 9/68* (2006.01)

(52) U.S. Cl. ..................... 382/209; 382/218; 382/219

(58) Field of Classification Search ......... 382/168–172, 382/209, 218, 219, 237, 291–292, 305; 707/6
See application file for complete search history.

(56) References Cited

U.S. PATENT DOCUMENTS 5,315,668 A * 5/1994 O'Hair ...................... 382/159
5,617,484 A * 4/1997 Wada et al. ................. 382/172

(Continued)

FOREIGN PATENT DOCUMENTS

JP 58-75279 10/1981

(Continued)

OTHER PUBLICATIONS

Ohya et al. "Recognizing characters in scene images", I.E.E.E. Pattern Analysis and Machine Intelligence, vol. 16, Issue 2, pp. 214-220.*

(Continued)

*Primary Examiner*—Brian Q Le
(74) *Attorney, Agent, or Firm*—Reed Smith LLP; Stanley P. Fisher, Esq.; Juan Carlos A. Marquez, Esq.

(57) ABSTRACT

A method and an apparatus for searching character image in an image whether the characters are incorporated into an image or separately picked up from a flip card, which are difficult to be detected by the prior art. The invention enables the character strings thereby detected to be searched in a common framework without relying on the language or the character font. An image is chosen, a character region is detected from the frame of the chosen image on the basis of its shape, and a visual feature of the character area is extracted. On the other hand, a character string to be searched for which has been entered by a character input means is drawn as an image, and a visual feature is extracted from the character area image. The visual feature of the obtained character area and the visual feature of the character area image are matched to determine a level of similarity, and the character region containing a character string the level of similarity of which has been determined is outputted.

22 Claims, 14 Drawing Sheets

EXTRACT VERTICAL LINES WHOSE WIDTH IS IN SPECIFIED RANGE (PIXELS WHICH FORM THE SAID LINES ARE MARKED UP BY X )

U.S. PATENT DOCUMENTS

| | | | |
|---|---|---|---|
| 6,347,156 B1 * | 2/2002 | Kamada et al. | 382/237 |
| 6,665,668 B1 * | 12/2003 | Sugaya et al. | 707/6 |
| 6,714,676 B2 * | 3/2004 | Yamagata et al. | 382/175 |
| 2002/0064311 A1 * | 5/2002 | Yahagi | 382/224 |

FOREIGN PATENT DOCUMENTS

| | | |
|---|---|---|
| JP | 1-265378 | 4/1988 |
| JP | 11-143879 | 11/1997 |
| JP | 2000-298725 | 4/1999 |

OTHER PUBLICATIONS

Akira et al. "A method for recognizing character strings from maps using linguistic knowledge.", I.E.E.E.E. 1993, pp. 561-564.*

Y. Tanaka and H. Torii, "Transmedia Machine and Its Keyword Search over Image Texts", Electrical Engineering Department of Hokkaido University, RIAO 88 Program Conference, pp. 248-259.

* cited by examiner

FIG. 4

| $P_1$ | $P_2$ | $P_3$ |
|---|---|---|
| $P_4$ | $P_5$ | $P_6$ |
| $P_7$ | $P_8$ | $P_9$ |

METHOD AND APPARATUS FOR CHARACTER STRING SEARCH IN IMAGE

BACKGROUND OF THE INVENTION

1. Field of the Invention

The present invention relates to a searching technique for images on air or in a database, or specifically, an image searching method permitting fast searching and identifying character region(s) in an image.

2. Description of Related Art

In an image, character information either incorporated into a scene or separately picked up from a flip card is one of target information items containing the content of the scene being expressed. This promotes research on keyword search and other aspects focusing on the detection of frames in which such a character-incorporated scene appears or character string texts are used.

In examining a character-incorporated image, commonly used techniques include: detecting (1) the lines constituting characters with high luminance, (2) the luminance difference between the characters and the boundaries, thereby forming edges present in the vicinities of characters, and (3) the static (for a certain length of time) character regions. For keyword search, the character regions detected as stated above are converted into character codes, such as ASCII (American Standard Code for Information Interchange) or JIS (Japanese Industrial Standards), by character recognition extensively used in document processing, then matching on the basis of the codes.

Apart from that, another technique is to search by taking notes of the shapes of characters. For instance, the Proceedings of Recherche d'Information Assistee par Ordinateur (RIAO), 1988, Cambridge, Mass., pp. 248-258 by Y. Tanaka and H. Torii titled "Transmedia machine and its keyword search over image texts" discloses that characters are read one by one from a printed document by a scanner or the like so as to correspond a code to each character on the basis of its shape features, and the same code is allocated to each matched character string entered from a keyboard, i.e., matching the two different groups of codes.

The technique disclosed in the literature cited above involves simplification of character and character recognition in that each character is matched with a code according to its shape. In this case, it is necessary to determine in advance what code is to be assigned to each character, and the application of the same search method to another language would require another set of matching codes.

Furthermore, since a feature quantity is assigned to each character, each character has to be cut out accurately, which is difficult to satisfy except in a document wherein characters are printed in sharp contrast against a plain background. However, a character string incorporated into a scene is often superposed over a complex background. Color blurring to images may make separate characters look continuous. There are many such factors adversely affecting the accuracy of separating individual characters.

There are many character portions which usually cannot by detected by any prior art methods for detecting incorporated character strings in printed documents and in images. For instance, characters written in ink on a flip card which are picked up with a camera are not particularly high in luminance and therefore have no particularly conspicuous luminance difference from their boundaries. Furthermore, along with the recent advancement in the performance features of character incorporating equipment, the choice of colors and shapes of characters becomes broader. For instance, in increasing cases, characters of low luminance, such as characters in black, are contoured for use in an image. Also, in a few instances, incorporated character strings flow and fade away. Thus characters are not always static.

Moreover, since keyword search based on character recognition relies on the language or the character font for recognition, search of characters in multiple languages or in different character fonts requires the availability of a recognition technique suitable for each language or character font. Especially in newscasts, travelogues or language lessons, images may involve words in many different languages, and it is not rare that these words are desired to be used as keywords for search. However, there would be too much capacity waste if the optimal character recognition technique is applied for every language and character font.

SUMMARY OF THE INVENTION

An object of the present invention is to provide a method and apparatus for searching character regions/zones in an image which incorporates characters/character strings in an image or a flip card that are difficult to detect by the prior art. The invention detects character strings in a common framework without relying on the language or the character font.

In order to achieve the above-stated object, a method for searching character(s) image in an image according to the invention comprises steps of entering an image, detecting a character region from the frame of the entered image on the basis of line features, extracting a first visual feature of the character area, providing a character string of interest which has been entered by a character input means, extracting a second visual feature from the character string image, matching the first visual feature and the second visual feature to determine a level of similarity, and outputting the character region and the level of similarity.

As this method identifies a character region containing the image of a string of characters, i.e., a character string image (instead of individual characters) and detects the character region on the basis of the shape of the character sting image, it detects a character area, either incorporated or separately picked up from a flip card, with neither high luminance nor significant luminance difference from the background so as to be difficult to detect by the prior art. Moreover, since detection is on a frame-by-frame basis, even a non-static region containing flowing characters can be detected. Furthermore, as the detected character region is matched by visual features of the character sting images, the match is accurate and does not rely on the language or the character font.

Other and further objects, features and advantages of the invention will appear more fully from the following description.

BRIEF DESCRIPTION OF THE DRAWINGS

The preferred embodiments of the present invention are illustrated in the accompanying drawings in which:

FIG. 4 is a diagram describing a blur removing filter;

FIG. 10 illustrates an image for extracting features of a character string of the invention;

DETAILED DESCRIPTION OF THE PREFERRED EMBODIMENTS

A method and an apparatus for searching character(s) image in an image according to the present invention is described in detail below with reference to a mode of implementing the invention illustrated in a number of drawings.

Figure 1:
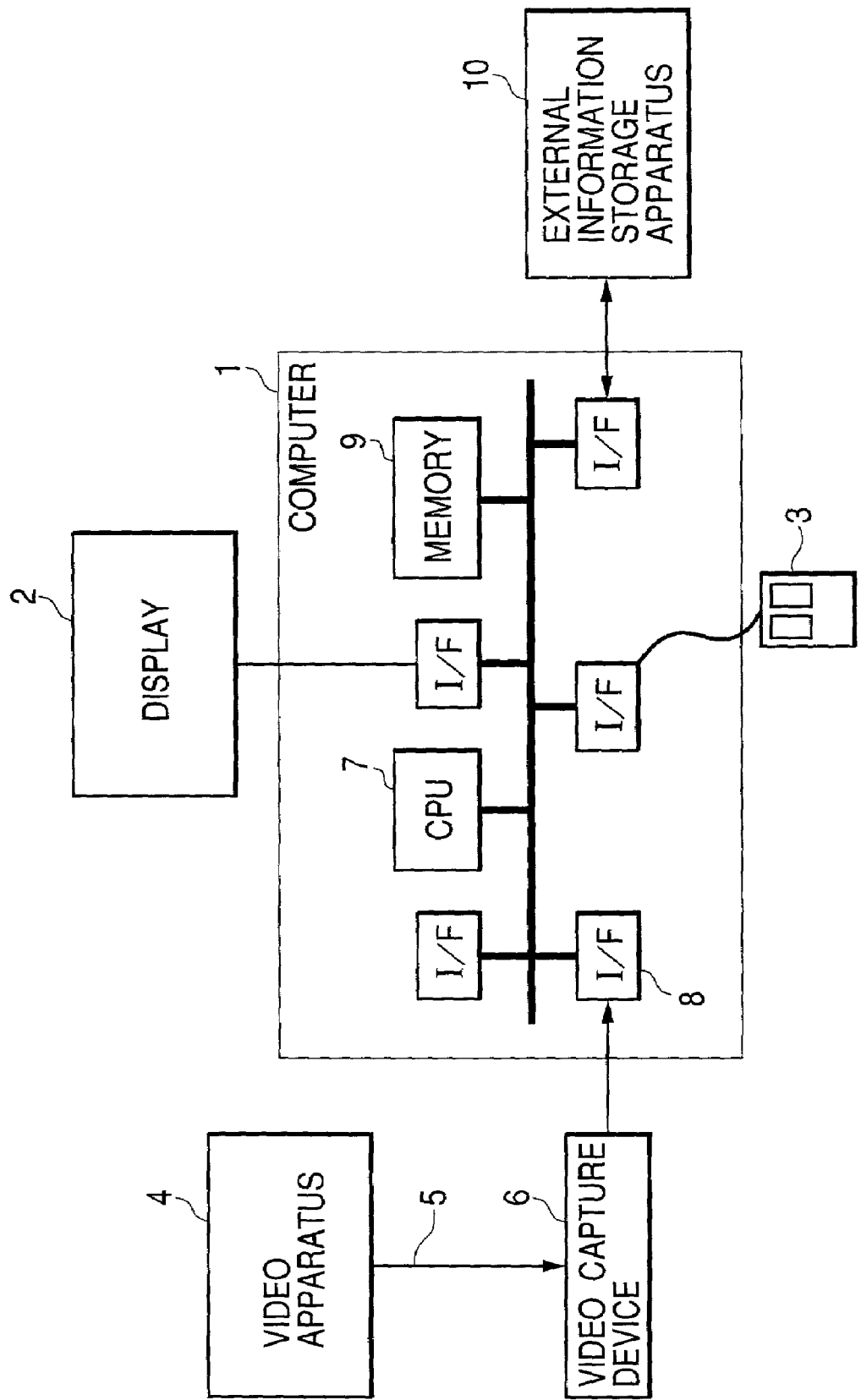
FIG. 1 is a schematic block diagram of an apparatus for searching character(s) image in an image according to the present invention.

FIG. 1 is a schematic block diagram of an apparatus for searching character image in an image according to the invention.

In FIG. 1, reference numeral 1 denotes a computer for executing search processing, 2 is a display unit, such as a cathode ray tube (CRT), for displaying an output frame from the computer 1, and 3 is an input unit using a pointing device for entering an instruction into the computer 1, such as a keyboard, mouse or touch panel. Video signals 5 are entered into the computer 1 from a video apparatus 4 via a video capture device 6.

The video apparatus 4 is a tuner unit for receiving programs transmitted by terrestrial broadcasting, a satellite, a cable or other broadcasting means, or an apparatus for reproducing images recorded on an optical disk, a videotape or the like. The video capture device 6 consecutively converts video signals 5 from the video apparatus 4 into digital video data and digital audio data. The images supplied from the video apparatus 4 are digital from the outset, no analog-to-digital conversion is required, but they can be converted here into a format more readily processible by the computer.

Within the computer 1, digital video data from the video capture device 6 enter into a memory 9 via an interface 8, and processed frame by frame by a central processing unit (CPU) 7 for executing a search processing program stored in the memory 9. Depending on the requirement of the processing, various information and data are stored in an external information storage apparatus 10. In addition to a program for causing the computer 1 to execute the processing of character search in an image, various data generated by the processing are stored in the memory 9, and the data are referenced whenever needed.

The details of the search processing flow according to the present invention executed by the above-described hardware, especially the CPU 7 of the computer 1, is explained below.

According to the invention, characters incorporated in an image are searched not as codes by character recognition but as character images, namely, by utilizing the unique shape of each character image. More specifically, the operation procedure is explained below.

First, a user of the invention enters a character string of interest, such as a keyword, into the computer 1 using the input unit 3 the same way as in an usual text searching. If the characters are letters of the Roman alphabet, each target stroke on the keyboard would enter a character. If the characters comprise Japanese words, conversion from Roman letters into Japanese phonetic letters and Chinese characters is executed at the same time by entering a sentence in which the two kinds of characters are mixed.

As a keyword is entered, the computer 1 reads one character at a time out of a font matching the keyword to draw an image of a character string. The font may be data in either a bit map for in a vector form. Search is done for a similar image with this character string image as the target. Thus an image with incorporated characters containing a visually similar to the target is supplied as the result of search.

Since currently available computer operation systems can handle various languages in a unified framework, it is easy to prepare a character string image in any desired language. As characters searched according to the invention are matched with such a character string image instead of character-by-character based on codes in the prior art, no cutting out of each individual character is required. Therefore, the invention is hardly susceptible to the influence of the precision of cutting out. Furthermore, because the size of the images to be matched can be relatively large, even if part of a complex background is mixed with characters, it can be statistically overlooked.

The invention is broadly divided into two processing sequences. One is an advance processing to analyze an image, to detect a character region either incorporated or separately picked up from an image, and to extract its features, while the other is a search processing to match the extracted features with the features of the keyword entered by the user to find out any similar ones.

The advance processing comprises character-incorporated scene detection and feature extraction. As mentioned, the feature quantities of a character-incorporated scene cannot be detected only by utilizing (1) high luminance, (2) edge concentration, or (3) standstill for a certain period of time technique. As such, the invention takes into account more universal features of characters.

Historically, characters have been written by a brush, a pen or the like, they are structured by lines in many languages. Therefore, where characters are present with concentration of lines. Moreover, the widths of the lines are mostly within a specific range determined by the size of characters. The invention takes advantage of this feature for detecting the presence of characters. It also uses another feature that the lines are monochrome or gradational. These features make previously undetectable characters become detectable.

Figure 2:
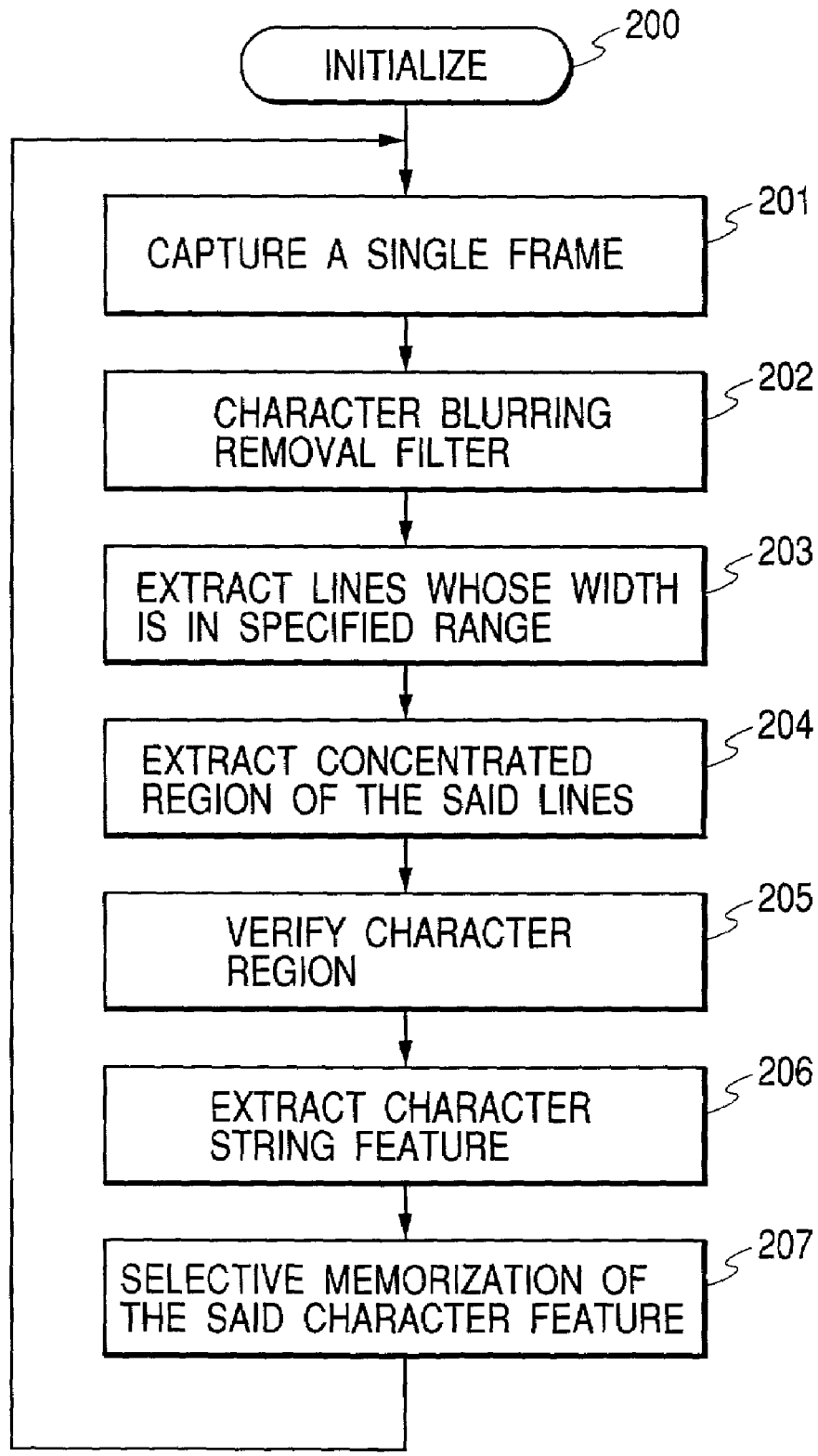
FIG. 2 is a flowchart of an advance processing for implementing a method for searching character(s) image in an image according to the invention.

A flowchart of character-incorporated scene detection and feature extract is shown in FIG. 2. After variables are initialized at step 200, one frame is entered from a video image (step 201). At the following step 202, filtering is carried out to remove character blurring peculiar to images.

An image in analog signals is not only intrinsically susceptible to border blurring but also often undergoes intentionally introduced anti-aliasing blurring to smoothen characters on a television receiver of low resolution. Blurring is a state in which two pixels constituting a border suffers intervence by another pixel having a level of luminance between those of the two. It reduces the luminance difference between the two pixels, and thereby makes edge detection difficult. A specific processing method for filtering this state is described afterwards.

Then at step 203, lines with a width in a specific range are extracted, and at step 204 these lines are checked to see whether they are concentrated in a specific region. If so, the region is extracted. The extracted region is checked again whether it can be appropriately regarded as a character region (step 205). If so, character portions contained in the region, i.e. image features of a character string, are extracted (step 206).

As any character-incorporated scene emerging in an image continues to be present somewhere in the image long enough for human perception, it is checked whether the characters are the same as what were extracted in the preceding frame, and only newly emerging ones are selectively memorized (step 207). The advance processing described so far is repeated from step 201 until all the images of interest have been searched.

Figure 3:
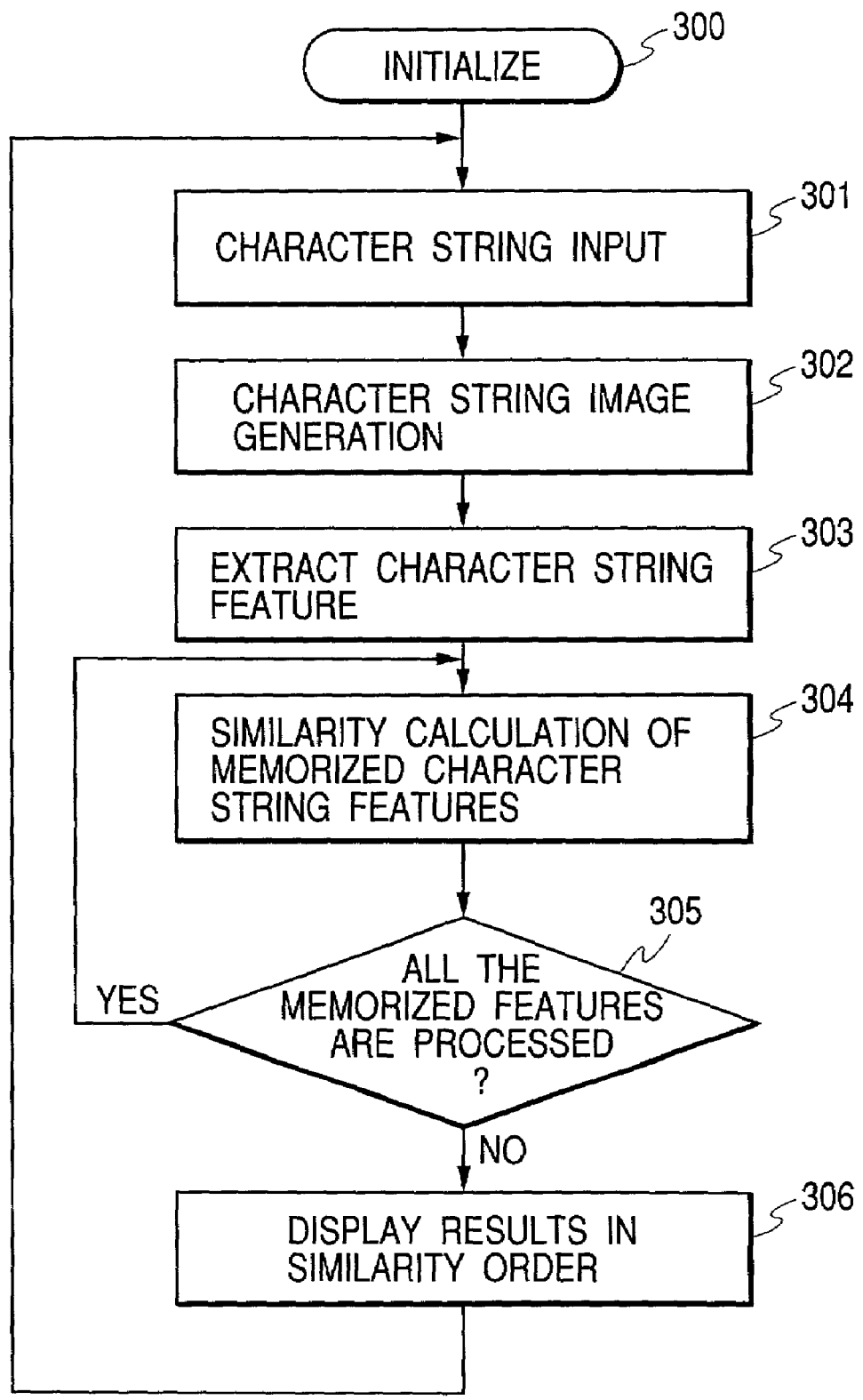
FIG. 3 is a flowchart of a search processing for implementing a method for searching character image in an image according to the invention.

With reference to FIG. 3, the search processing for matching the character features extracted as described above with features of the keyword entered by the user is described.

First, variables and the like are initialized at step 300, and at the following step 301 any desired character string is inputted by the user via any extensively applied methods in a personal computer, word processor or the like. This character string is drawn into a bit map image using a character font prepared in advance (step 302). Features of the character string are extracted from the image thereby obtained (step 303), and similarity is sought to all the features of the character strings memorized at the foregoing step 207 (steps 304 and 305). The features of the memorized character strings are sorted in a descending order of similarity as the result of the search (step 306).

Each step of the search processing is described in further detail.

Figure 4:
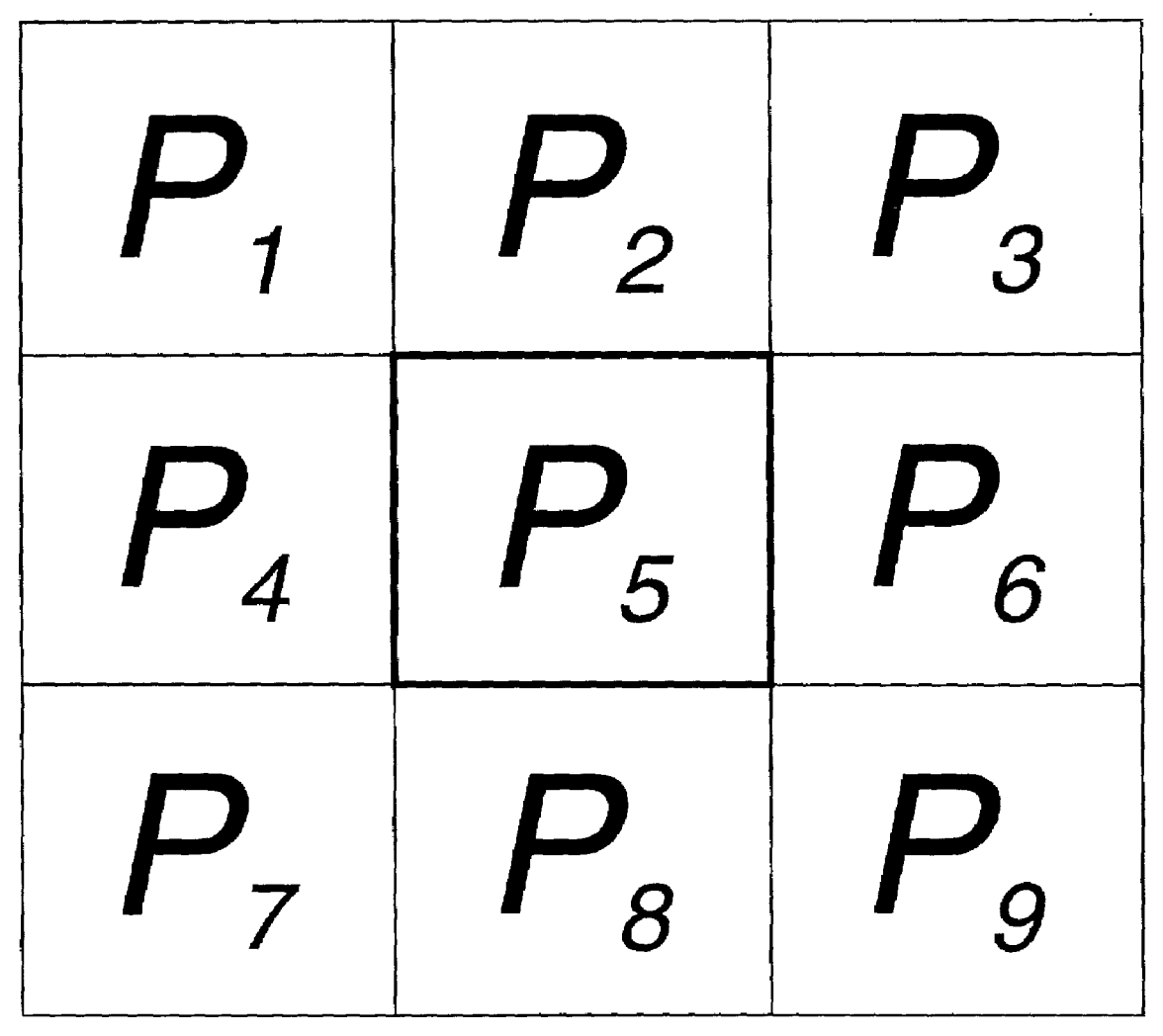

The filtering at step 202 of FIG. 2 is specifically carried out, for instance, by a 3×3 filter illustrated in FIG. 4. FIG. 4 shows that the central pixel P5 is determined by combining the luminance values of all the pixels adjacent to the pixel P5, i.e. pixels P1 through P9. The maximum and minimum values of the nine pixels are figured out, and the luminance value of P5 is corrected to one of the two values whichever is closer to it. This can be mathematically expressed as follows:

Pmax=MAX {P1, P2, P3, P4, P5, P6, P7, P8, P9}

Pmin=MIN {P1, P2, P3, P4, P5, P6, P7, P8, P9}

If $P5-Pmin<Pmax-P5$, then $P5 \leftarrow Pmin$ else $P5 \leftarrow Pmax$

Where the image size can be expressed by the width (w) and the height (h) in the number of pixels, and the origin (0, 0) is at the peak to the upper left of the image, all the coordinates in the range of 1 to w-2 (i.e. width) in x coordinate and of 1 to h-2 (i.e. height) in y coordinate are subjected to P5 correction. Since the purpose is to remove border blurring, the correction can as well be focused only on the borders, i.e. the parts constituting edges, for fast processing. If necessary, the filter size may be 5×5 or 7×7 instead of 3×3. This filtering unifies the intermediate luminance value occurring on the border and the luminance value of either pixel constituting the border to make the border definite.

Figure 5:
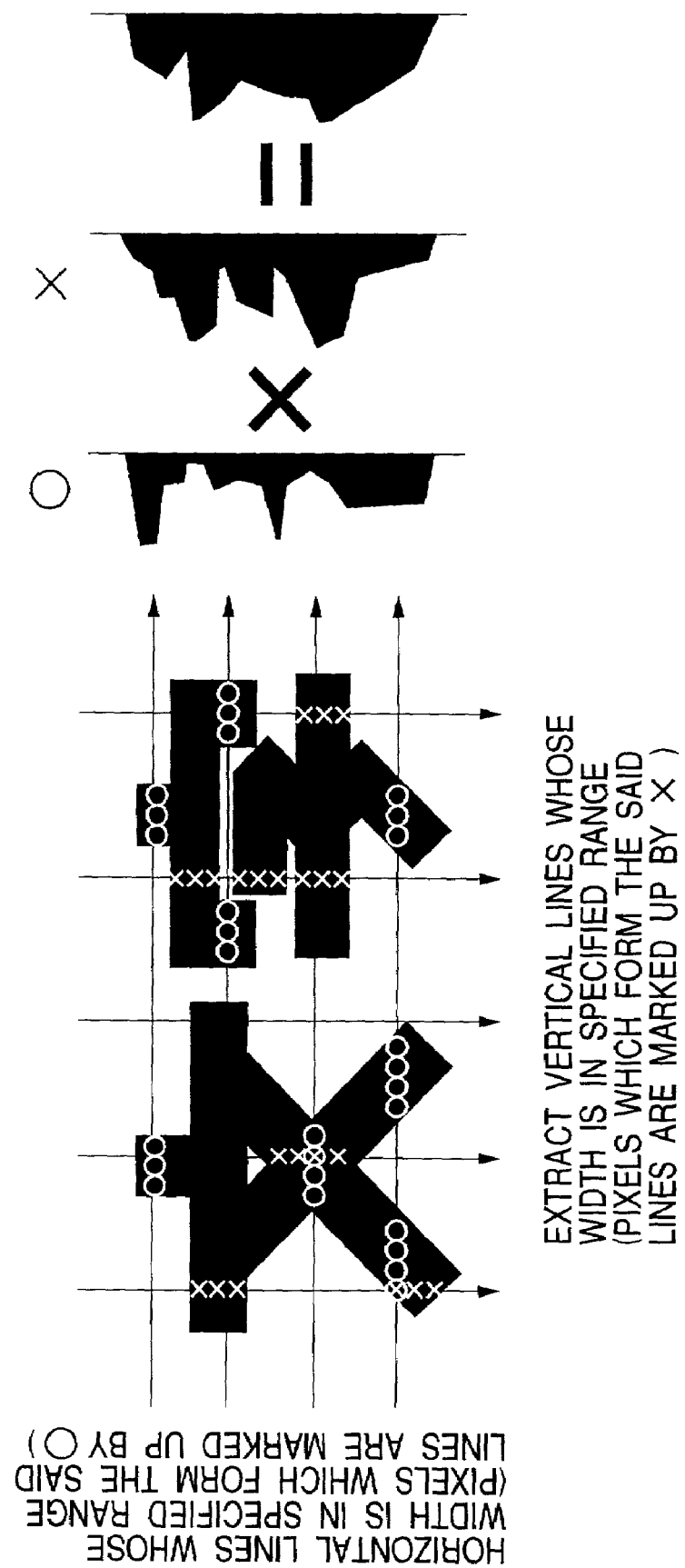
FIG. 5 illustrates an image describing an outline of a character region extracting method of the invention.

The step 203 for extracting lines with a width in a specific range and the step 204 for extracting a concentrated region of such lines are described as follows. The extraction of lines with a width in the specific range is illustrated in FIG. 5. While various methods are conceivable for selective extraction of such lines. The extraction is simplified by extracting portions whose feature is associated with the presence of lines with widths in a specific range instead of strictly extracting all lines and measuring their widths.

More specifically, equi-luminance pixel strings extending within a pre-designated length range in both vertical and horizontal directions and with a luminance difference within a pre-designated range are extracted, and each pixel is marked. Pixels marked with "o" in FIG. 5 constitute an equi-luminance pixel string in the horizontal direction, and pixels marked with "x" constitute an equi-luminance pixel string in the vertical direction. In the vertical and horizontal directions, three and four pixels are within the respectively designated length ranges.

In a region where there are many pixels marked with "o" or "x", characters are present. For identifying a region, a commonly used projection method in the field of reading and recognizing printed documents is utilized. Since a character is often composed of vertical and horizontal lines complexly intertwined with each other, in a region where characters are present equi-luminance pixel strings in both horizontal and vertical directions are concentrated. Thus, pixels marked with "o" and "x" are concentrated at the same region. Use of this feature enhances the identification accuracy.

Accordingly, a projection is resulted by counting of "o" marks and "x" marks on each scan at the pixel intervals in the vertical and horizontal directions in a frame of image, then multiplying the respect "o" and "x" values on each line. On this basis, a character region is detected. If neither "o" mark nor "x" mark is present, the value of projection is 0. The identification of a character region is enhanced. In conducting this multiplication, since pixel-by-pixel scanning may often result in a failure of "o" and "x" marks to emerge simultaneously in a character region, it is advisable in some cases to take advantage of such a failure by multiply the totals of scanning a plurality of lines (i.e., by multiplying the total number of scanned lines in X and the total number of scanned lines in Y).

The pixels constituting the equi-luminance pixel string are selected according to the presence of luminance values in a pre-designated range in addition to the presence of luminance differences in a pre-designated range.

Figure 6:
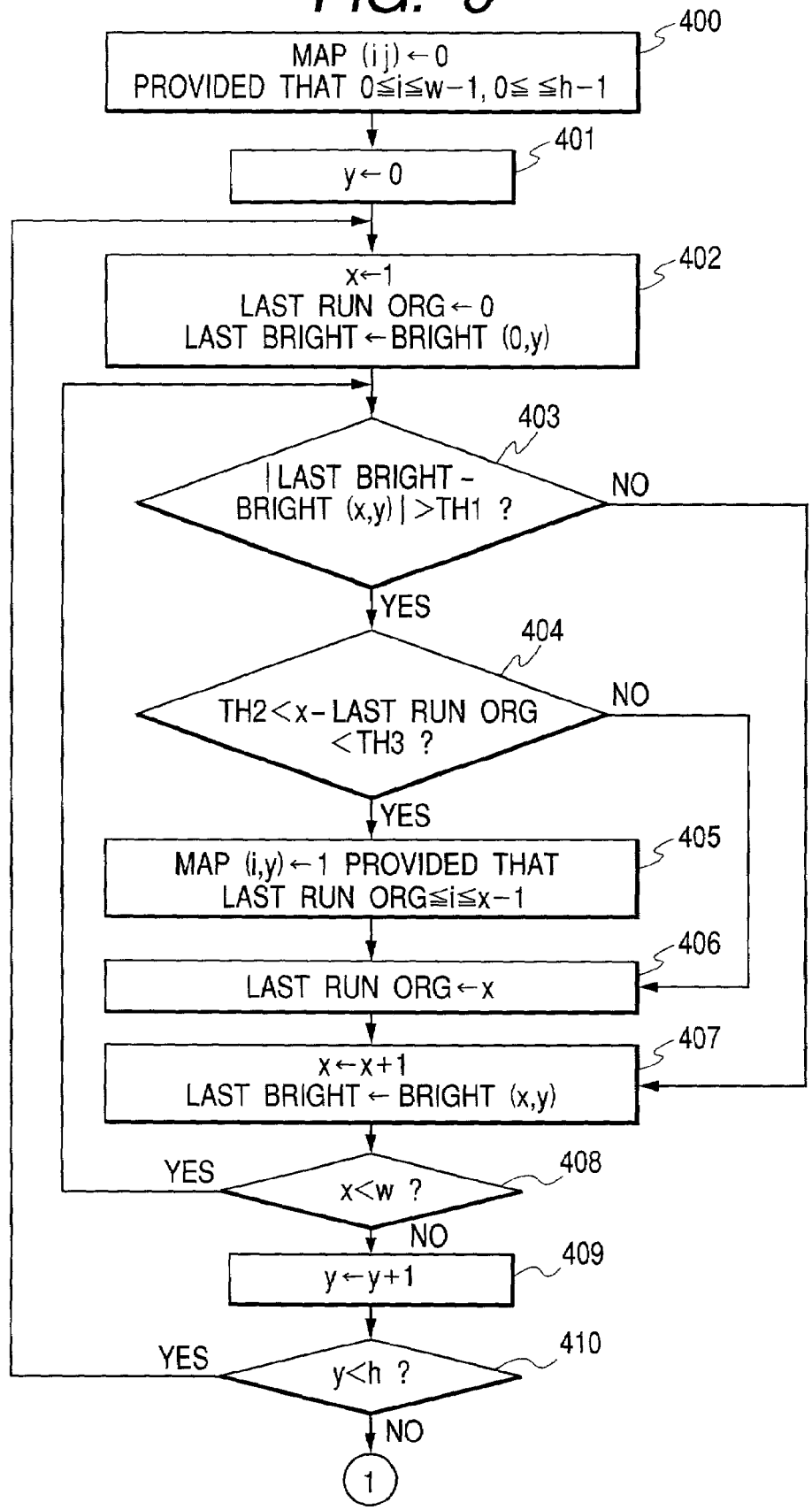
FIG. 6 is a flowchart of an extraction processing of a specific line width region to generate a map of pixels according to the invention.
Figure 7:
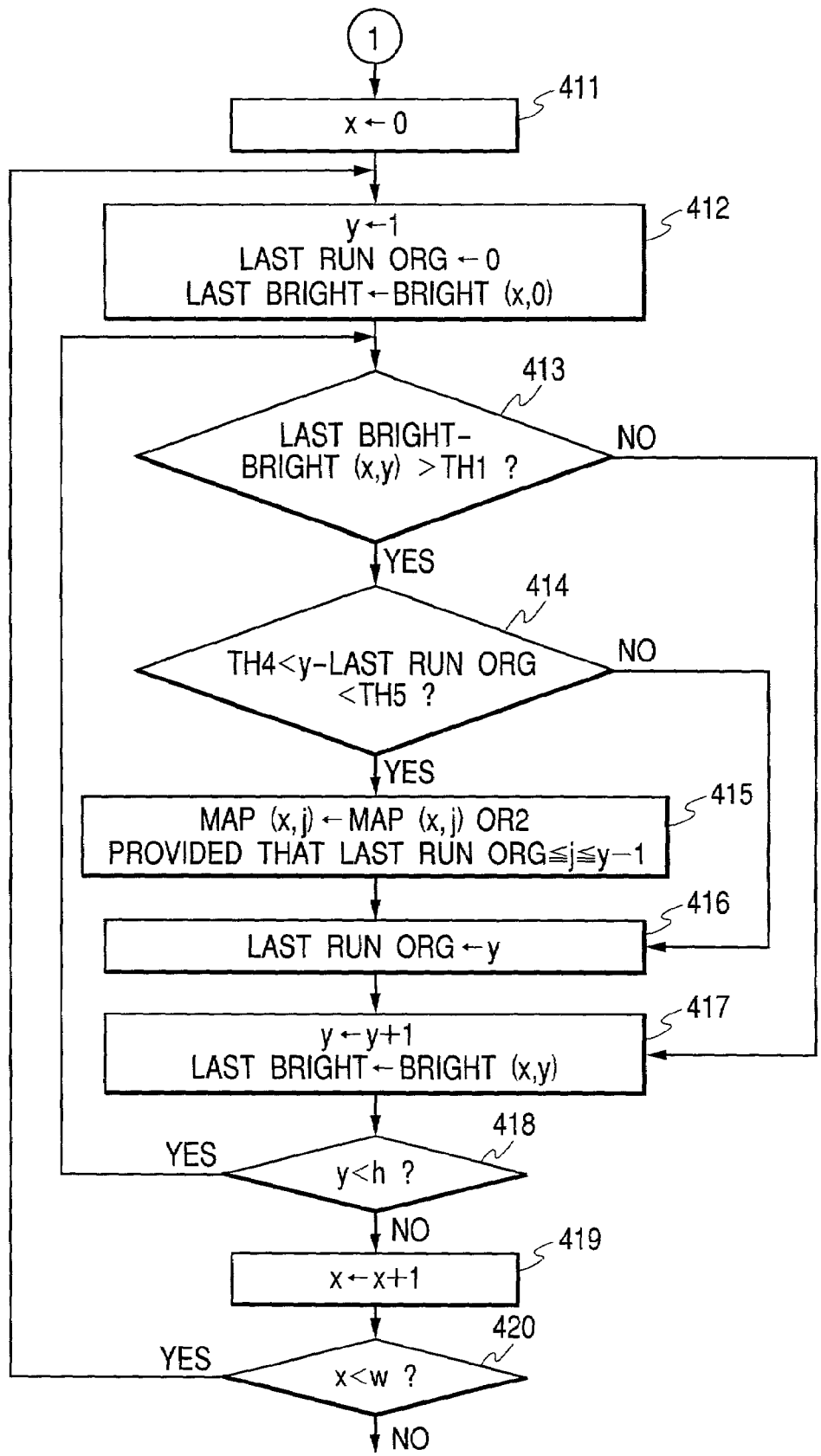
FIG. 7 is a flowchart continuing from FIG. 6.

Flowcharts for extracting lines with a width in a specific range at step 203 are shown in FIG. 6 and FIG. 7. In this processing, a two-dimensional arrangement Map (i, j) matching the size of the frame of image of interest is readied with an initial value of 0, and every time an equi-luminance pixel string of a specific length is detected in either horizontal or vertical direction, the value in the matching position on Map (i, j) is altered to a corresponding non-zero value.

At step 400, Map(i, j) is initialized, and at step 401 a loop counter in the y direction is reset. Then at the following step 402, a loop counter and the starting point of the equi-luminance pixel string in the x direction are set to their respective initial values.

At step 403, the absolute value of the luminance value difference between two pixels adjoining in the x direction is figured out and, if it is not above a threshold TH1, the process goes on to step 407 without doing anything here. If it is above the threshold TH1, the process goes on to step 404. At step 404, it is checked whether or not the difference between the last memorized starting point of an equi-luminance pixel string and the current point is greater than a threshold TH2 and smaller than a threshold TH3. If so, '1' is putted into the Map arrangement in the position matching this pixel string because that this pixel string is highly likely to belong to a line with a width in the specific range (step 405). The starting point of the pixel string is updated to the current point (step 406), and the loop counter in the x direction is advanced by 1 (step 407), followed by repeating these steps (steps 403 through 408) along the x-axis as long as the width (w) of the frame of image (step 408). Further, the loop counter in the y direction is advanced by 1 (step 409), followed by repeating these steps (steps 402 through 410) along the y-axis as long as the height (h) of the frame of image (step 410).

Similarly, as shown in FIG. 7, equi-luminance pixel strings in the y direction are obtained as well (steps 411 through 420). The distribution of the equi-luminance pixel strings then can be memorized by adding 2 to the Map arrangement obtained by the processing until step 410 (step 415). Thus, each spot where the value of the Map arrangement is 0, does not belong to any equi-luminance pixel strings in either the x or the y direction. If the value is 1, the spot belongs to an equi-luminance pixel string in the x direction only. If the value is 2, the spot belongs to an equi-luminance pixel string in the y direction only. If the value is 3, the spot belongs to equi-luminance pixel strings in both directions.

Next, extracting of a concentrated region of lines with a width in a specific range at step 204 can be accomplished basically by finding a region in which non-zero values in the Map arrangement are included. The extraction of a character region out of the Map arrangement uses the described projection method.

Figure 8:
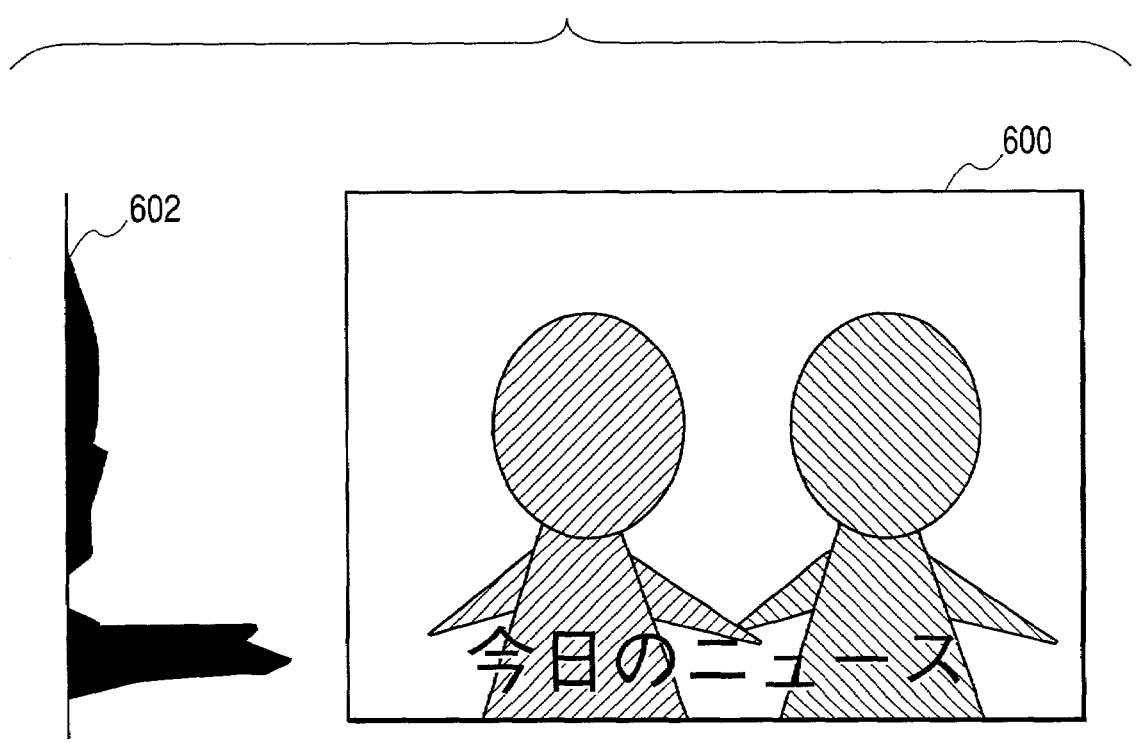
FIG. 8 illustrates an image for describing an outline of identifying a region in which characters are present.

As shown in FIG. 8, where a laterally written character-incorporated scene in a frame 600 is to be detected, a projection 602 in the horizontal direction results in the emergence of a peak of the projection in a portion where a character-incorporated scene is present. This reveals the starting point and height in the y direction where the character-incorporated scene is present. Then, by taking a projection for a region in the range of the y-axis, the starting point and width in the x direction is defined. When a character-incorporated scene is written longitudinally, a projection in the vertical direction is taken first to determine the starting point and width in the x direction, followed by determining the starting point and height in the y direction.

Figure 9:
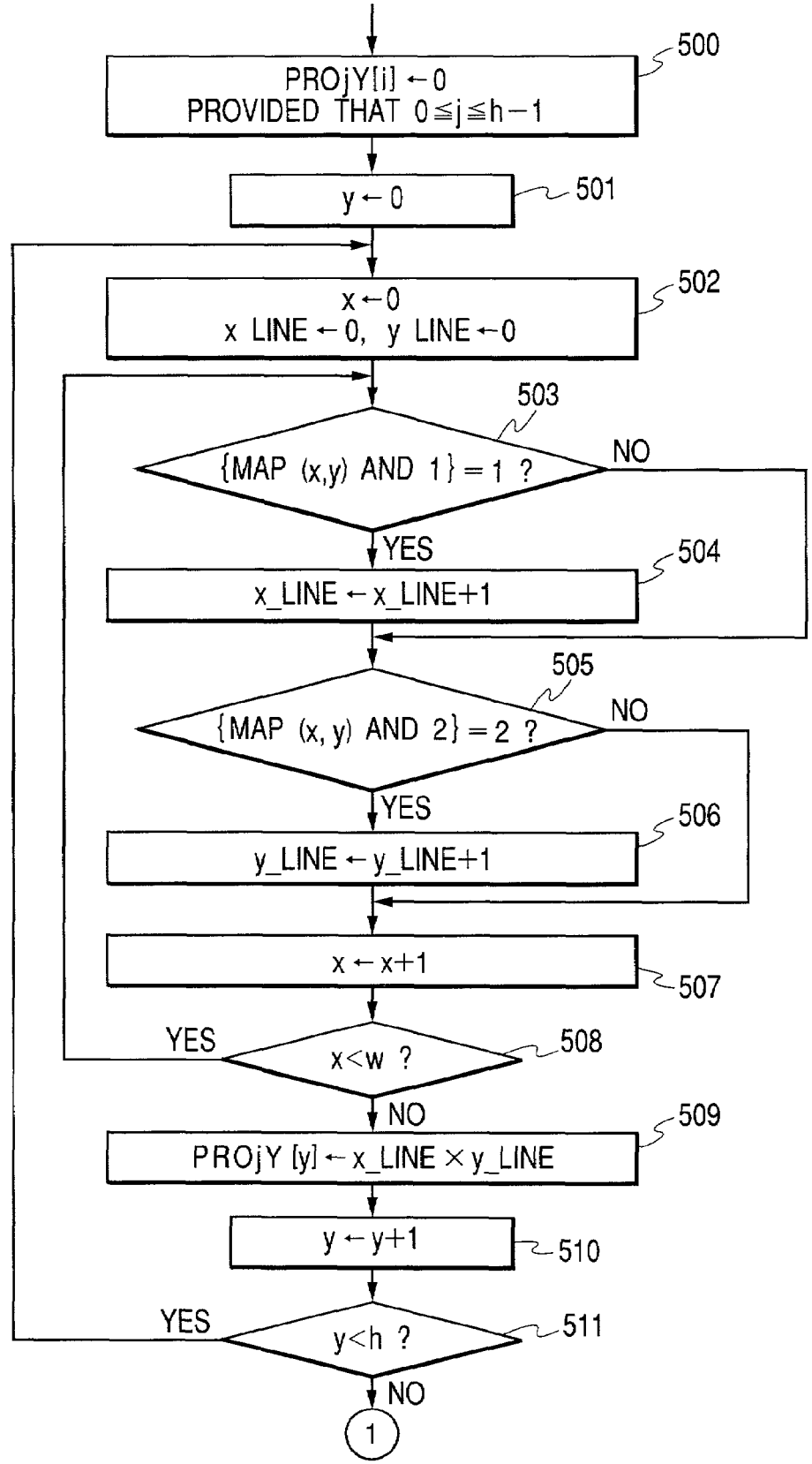
FIG. 9 is a flowchart for extracting a concentrated region of specifically wide lines of the invention.

More specifically, the flowchart shown in FIG. 9 shows the processing for locating a concentrated region of specifically wide lines. First at step 500, a projection ProjY is initialized, and at the following step 501, the loop counter in the y direction is reset. At step 502, an initial value of 0 is entered into the loop counter in the x direction and variables x_line and y_line for counting the numbers of equi-luminance pixel strings in both x and y directions.

The whole image is scanned pixel by pixel and, if an equi-luminance pixel string in the x direction is detected, 1 is added to x_line or, if an equi-luminance pixel string in the y direction is detected, 1 is added to y_line (steps 503 through 508).

Then, the product of multiplication of x_line and y_line is entered into the projection ProjY (step 509). The foregoing is repeated (step 502 through 511) along the y-axis as long as the height of a frame of image (steps 510 and 511). If at step 509 it is found that no equi-luminance pixel string is present in either the x-axis or the y-axis, the projection will take '0' or low values.

At step 205 of FIG. 2, it is finalized whether or not the extracted character region is appropriate as a character region. For instance, if the extracted character region is extremely small, it is unlikely to be a character region. As such, if the height or the width of a detected region is smaller than a predetermined threshold, it is not regarded as a character region and discarded.

If the detected character region is embedded in a complex background with many edges, it is difficult to accurately separate characters from the background unless the characters are recognized and their shapes are defined. To remove as much of the background as possible in such a case, the inside of the character region is searched for pixels on the outlines of a rectangle wrapping the character region with a sufficient allowance as starting points, pixels of the same color and of equal luminance values are removed as elements of the background. Since characters have evident borders with the surroundings, i.e. the outlines, they will not be removed together with elements of the background.

It is a self-correction mechanism to correct any misconception of objects in the image or the pattern of the background as characters by removing much of a seeming character region as elements of the background. Therefore, unless most part of a seeming character region remains after the processing of background removal, it will be discarded. This appropriateness determination processing is applied to each seeming character region obtained by combining luminance value screening, line width screening, longitudinal verse lateral projection screening, and the appropriateness screening, and what has been finally appropriate is selected as a character region.

In the character string feature extraction at step 206, features of the character region extracted as a character-incorporated scene are extracted. Although it is also possible to memorize the character-incorporated scene itself as features to carry out classical image matching, such as template matching or the like, the quantity of data to be memorized would be too large, and many problems would be involved regarding arithmetic efficiency. In matching character image feature strings, because of the diverse difference in size between the character-incorporated scene and the template, the final result of matching should be obtained only after the highest level of similarly is determined. Two-dimensional matching without any size limitation involves a vast quantity of computation. Accordingly, it is unsuitable for any searching and matching of a large numbers of characters.

Therefore, the invention uses a one-dimensional feature string for matching 2D character images in which the number of vertical "edges" is counted once wherever the luminance changes in a predetermined way, such as from 0→1, at a predetermined density and the numbers are arrayed horizontally as shown in FIG. 10. By having information in the y direction, out of the two dimensions of x and y, represented by the number of "edges" whose value is unaffected by luminance change from inside to outside of the predetermined range, the image features of a character string are expressed in the one-dimensional feature string.

For a character image written vertically, the number of horizontal edges of a one-dimensional feature string is counted at a predetermined density, and the numbers are arrayed vertically.

The character string features in an image obtained in this way are subjected (at step 304 of the flow shown in FIG. 3) to the calculation of similarity to the features of the user-entered character string (step 303), i.e. feature matching. For this purpose, elastic matching in only one dimension is sufficient. One of various high speed techniques, especially the DP (dynamic programming) matching, can be applied as a method of one-dimensional elastic matching.

Each value in this one-dimensional feature string is an accumulated number of edges, and it contains only a small quantity of information by itself. The number of the permutations or combinations of these values may vastly increase in proportion to the length of the character string. Any character string worth search is likely to have a sufficient length such that a higher identifying performance is expected. Furthermore, a character string simple figurative characters is correctly searched. The information on the type of line for which the edge forms a border, such as vertical (|), horizontal (—), upward to the right (/), or upward to the left (\), may be added as one of the features supplementary to the number of edges.

Figure 11:
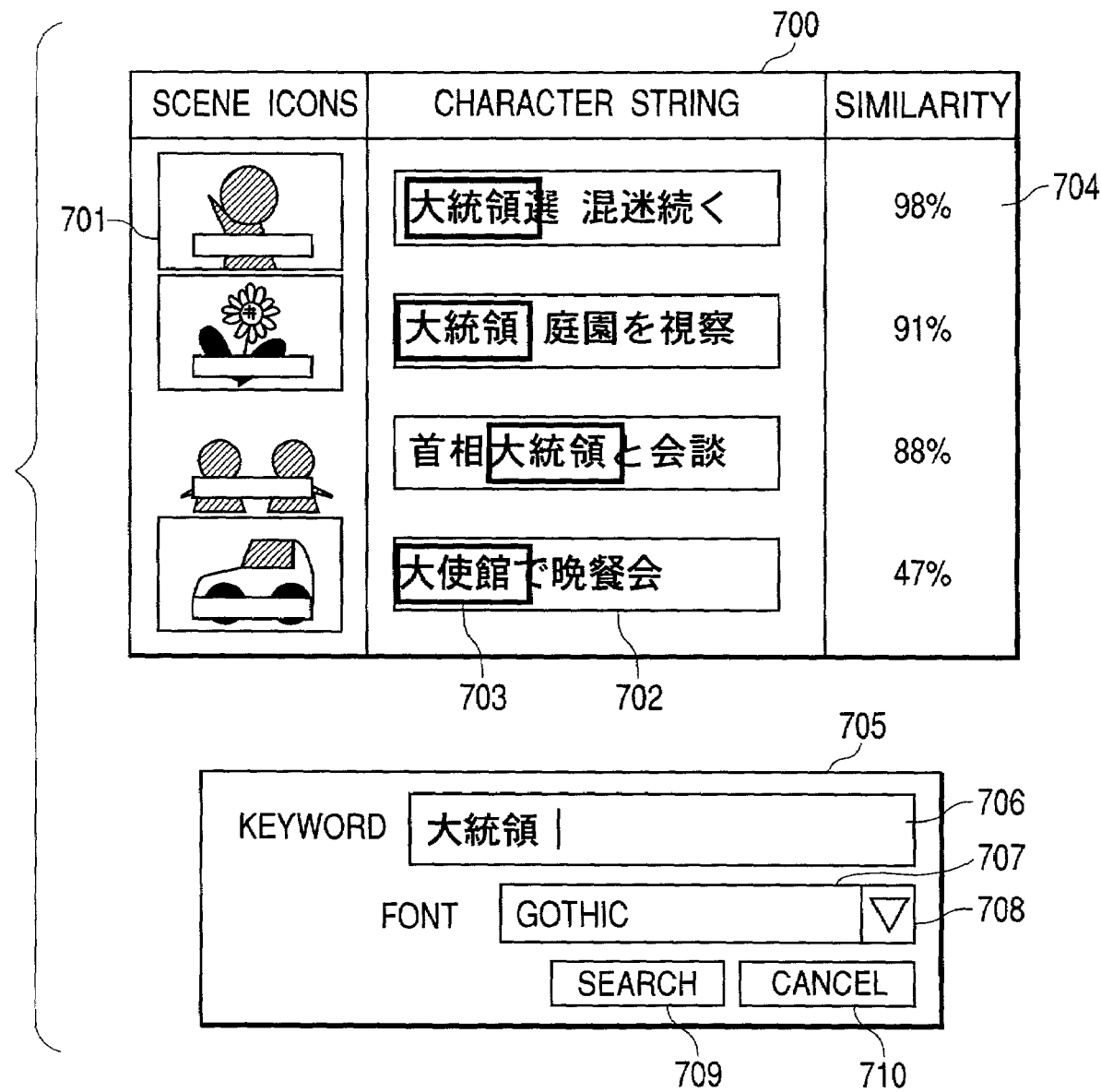
FIG. 11 is a diagram showing an operation interface for use in search according to the invention.

FIG. 11 illustrates one user interface for use in the above-described character searching method. In FIG. 11, reference numeral 700 denotes a search result output screen, and 705 denotes one search keyword input screen. The user, via a keyboard or the like, enters any character string of interest into a text input region 706. After confirming that the character string has been correctly entered, the user presses a search button 709 to start search processing, and the result of keyword character string searching is displayed as shown in 700. To stop searching, a cancellation button 710 is pressed upon.

On the screen 700, each of a frame image 701 has a character string embedded in a character-incorporated scene similar to the keyword character string, and the respective similarity rates 704 are listed in the descending order. It is thus possible to recognize the scene in which the keyword character string is incorporated. Since the user wants to see many results at a time, the frame of displayed image has to be a thumbnail display, in which each character-incorporated scene is compressed to as small as possible but sufficient for judging whether or not the search result is correct. For this reason, each character region alone is expanded and displayed in a separate box 702. It is also possible to highlight the retrieved keyword character string by surrounding it with a box 703. The position of the box 703 relative to the character string may more or less vary with the background, character font or the like, since it surrounds a character string determined by feature extraction. It is also possible to identify the position of a particular scene in the sequence of images by displaying address information, such as a time code, together with the frame of image. Furthermore, to increase the density of information displayed in the list, if there are a plurality of higher ranked character string search results in a single frame, the lower ranked results can be displayed in the same screen.

According to the present invention, because of its searching principle, a character font completely different from the font selected for the entered keyword may sometimes results in failure of detecting from the character-incorporated scene. Therefore, the font is made selectable in an input column 707 to limit the number of available fonts. The available options are shown by pressing a button 708. While the prior art search based on character recognition would require a recognition processing algorithm, the invention addresses the problem by merely switching the font in this way.

Figure 12:
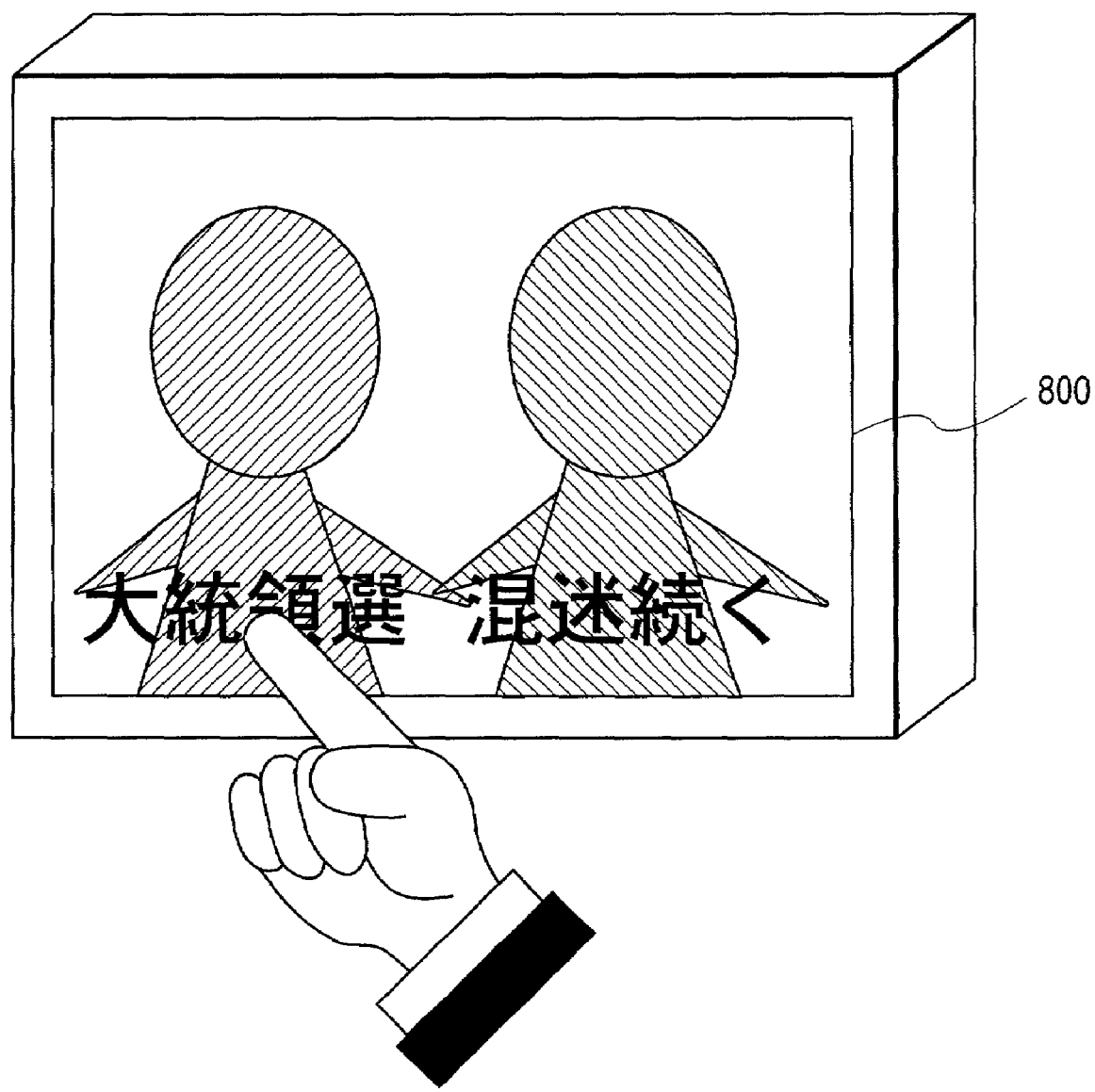
FIG. 12 is a diagram showing an operation interface using a touch panel.

FIG. 12 shows an operation interface in which search is accomplished without using the search keyword input screen 705. By pointing a character string displayed on a screen 800 with a pointing device or the like, all the character-incorporated scenes containing the same character-incorporated scene can be search. As the keyword is given in an image from the outset by this method is already a character string, there is no need to convert it into a character string, and no font designation is needed. Even if some unknown characters are in the keyword, every scene containing that keyword can be found although the unknown characters cannot be entered via any keyboard. It will facilitate efficient watching of a televised lesson on an unlearned language.

Moreover, according to the invention, if a specific keyword is designated in advance, the moment at which the keyword appears in the image can be automatically notified. For instance, such a word or phrase as "flash news", "typhoon", "earthquake" or "communication suspended" is memorized, the urgent information can be sensed as soon as it appears.

Similarly, out of an advertisement image, it is possible to automatically detect a patterned phrase indicating the address of pertinent information, such as "www" or "http", and to selectively record only those frames for subsequent reference. Especially for such items of address information as the domain name or the uniform resource locator (URL) on the Internet, since the number of advertisers is limited, template patterns for the address information on companies and organizations are stored for later identification of a company or an organization by matching. Using character-code address information for actual automatic connection with an Internet browser or the like, the web site of the company or organization can be readily accessed. The character-code of an URL address is converted into an image and matched automatically by the server of a service provider. In this case, appears to the user that, the browser connection is automatically changed along with the TV broadcast. Or the arrangement may be such that the connection is established only when the user clicks the character region of the address with a mouse or the like.

Furthermore, the invention uses visual database scene searching by text input without requiring any manual indexing. The invention also improves the efficiency of manual keyword assignment. In indexing, a scene associated with a specific keyword is discovered by utilizing the invention, and registered into the index. This will make possible, from next time, high speed retrieval only by pure text searching of the keyword so as to retrieve the indexed data.

The objects of processing according to the invention are not confined to televised images, but also a broad range of images. For instance, character strings written on billboards on the street can be processed according to the invention. Snapshots or video clips taken on a sightseeing occasion could be searched with characters on signboards. In particular, a signboard in one shot bearing the geographical name or a brief history of the place at tourist spots would serve as an excellent keyword image in searching a vast library of photographs and video clips.

The above-mentioned automatic network connection by detecting address information can also be applied to images other than a TV frame. For instance, by shooting address information written on a signboard or the like and subjecting it to the above-described processing, the relevant web site can be easily accessed. Or in this case, the function is preferable to be integrated into a small portable unit for shooting photos, processing according to the invention, and displaying the web site. One way is to produce such a unit of hardware, but such a small unit with fast enough computing functions to process images at high speed may be difficult technically or economically. To solve this problem, a mobile telephone or a network-connectable portable terminal unit is used to transfer the heavy load of processing to a network server.

Figure 13:
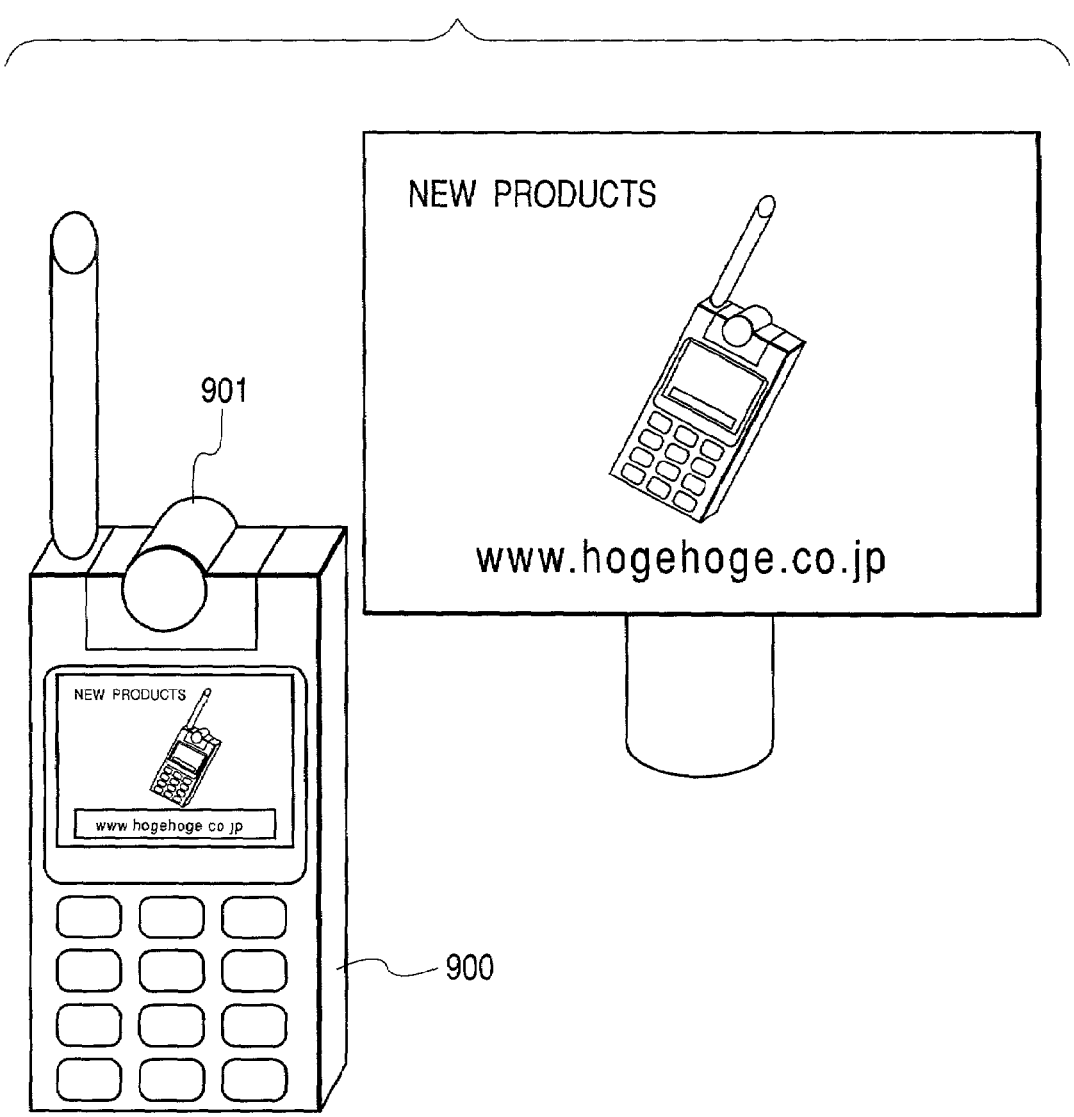
FIG. 13 is a diagram showing the invention applied by a mobile telephone.
Figure 14:
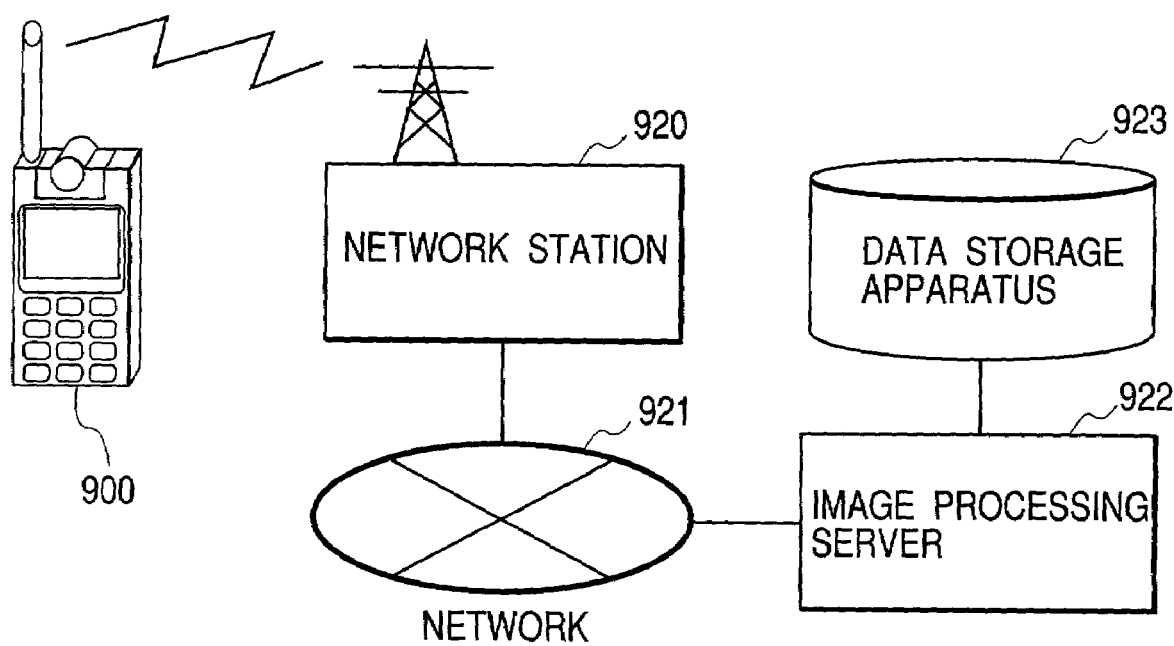
FIG. 14 is a diagram showing a mobile phone system utilizing the invention.

FIG. 13 illustrates an application of the invention. A mobile telephone 900 is mounted with a camera 901, with which any signboard or the like can be shot. FIG. 14 is a block diagram of such a system, where-by image data picked up with the camera 901 are transmitted by the mobile telephone 900, relayed by a network station 920, and undergo processing for address information extraction by an image processing server 922 connected to a network 921. The processed result is returned to the mobile telephone 900 via a reverse route. A data storage apparatus 923 is connected to the server 922, and stores template data on address information and so forth. By updating the template data, automatic response to any new address information can be secured without requiring the user of the mobile telephone to do any particular operation.

According to the present invention, because the search is done by matching character strings instead of individual characters, any desired character string in character-incorporated scenes in a video image sequence or characters on flip cards can be searched for regardless of the language and without character recognition. Even where characters have a complex background, i.e. even if the background involves some noise, search can be accomplished stably.

The foregoing invention has been described in terms of preferred embodiments. However, those skilled in the art will recognize that many variations of such embodiments exist. Such variations are intended to be within the scope of the present invention and the appended claims.

What is claimed is:

1. A method for searching at least one character string image in an image, comprising:
    providing a first image;
    detecting a character region in the first image based upon a shape thereof;
    extracting a first image feature of the character region, said first image feature containing image sub-features of a character string;
    receiving an input of a character string of interest by a user;
    generating a second image of said character string of interest;
    extracting a second image feature from the second image, said second image feature containing image sub-features of said character string of interest;
    comparing the first image feature with the second image feature to determine a level of similarity therebetween without breaking down the first and second image features per character into separate characters; and
    outputting the character region or the first image comprising the character region based on the level of similarity,
    wherein both the first image feature and the second image feature to be extracted are one-dimensional feature strings whose numbers of edges in a vertical direction are obtained by binarizing luminance of each pixel and counting numbers of luminance changes in the character regions, when the character strings are arrayed horizontally, and
    the step of determining a level of similarity involves elastic matching of the one-dimensional feature strings both of which constitute the first image feature and the second image feature.

2. The method for searching at least one character string image in an image, as claimed in claim 1, wherein at the step of outputting said character region outputs the character regions in a descending order of a level of similarity.

3. The method for searching at least one character string image in an image, as claimed in claim 1, wherein the step of detecting said character region involves extracting equi-luminance pixel strings, each of which has a luminance difference from a background in a pre-designated range and has a length of a pre-designated extent.

4. The method for searching at least one character string image in an image, as claimed in claim 1, wherein the step of detecting said character region involves extracting equi-luminance pixel strings, each of which has a length equal to or longer than a pre-designated length in both vertical and horizontal directions and has a luminance difference from a background within a pre-designated range in both of the vertical and horizontal directions.

5. The method as claimed in claim 1, further comprising a step of removing non-character background in the image by outlining the character region with a rectangle box having a sufficient margin, then removing pixels outside of the rectangle box, and wherein the outputting step outputs the character region with the rectangle box.

6. The method for searching at least one character string image in an image, as claimed in claim 1, wherein the first and second image features are elastically and one-dimensionally extracted and then compared.

7. A method for searching at least one character string image in an image, comprising:
    providing a first image;
    detecting a character region in the first image based upon a shape thereof;
    extracting a first image feature of the character region, said first image feature containing image sub-features of a character string;
    receiving an input of a character string of interest by a user;
    generating a second image of said character string of interest;
    extracting a second image feature from the second image, said second image feature containing image sub-features of said character string of interest;
    comparing the first image feature with the second image feature to determine a level of similarity therebetween without breaking down the first and second image features per character into separate characters; and
    outputting the character region or the first image comprising the character region based on the level of similarity,
    wherein both the first image feature and the second image feature to be extracted are one-dimensional feature strings whose numbers of edges in a horizontal direction are obtained by binarizing luminance of each pixel and counting numbers of luminance changes in the character regions, when the character strings are arrayed vertically, and
    the step of determining a level of similarity involves elastic matching of the one-dimensional feature strings of the first image feature and the second image feature.

8. The method for searching at least one character string image in an image, as claimed in claim 7, wherein at the step of outputting said character region outputs the character regions in a descending order of a level of similarity.

9. The method for searching at least one character string image in an image, as claimed in claim 7, wherein the step of detecting said character region involves extracting equi-luminance pixel strings, each of which has a luminance difference from a background in a pre-designated range and has a length of a pre-designated extent.

10. The method for searching at least one character string image in an image, as claimed in claim 7, wherein the step of detecting said character region involves extracting equi-luminance pixel strings, each of which has a length equal to or longer than a pre-designated length in both vertical and horizontal directions and has a luminance difference from a background within a pre-designated range in both of the vertical and horizontal directions.

11. The method as claimed in claim 7, further comprising a step of removing non-character background in the image by outlining the character region with a rectangle box having a sufficient margin, then removing pixels outside of the rectangle box, and wherein the outputting step outputs the character region with the rectangle box.

12. The method for searching at least one character string image in an image, as claimed in claim 7, wherein the first and second image features are elastically and one-dimensionally extracted and then compared.

13. An apparatus for searching character string images in an image having separate characters, comprising:
- a means for providing a first image,
- a means for detecting a character region from the frame of the first image on the basis of its shape,
- a means for extracting a first image feature of the character region, said first image feature containing image sub-features of a character string,
- an input means for entering a desired character string by a user,
- a character image generating means for drawing a second image of the desired character string,
- a means extracting a second image feature from the second image, said second image feature containing image sub-features of said character string of interest,
- a feature matching means for matching the first image feature with the second image feature and determining a level of similarity therebetween without breaking down the first and second image features per character into separate characters, and
- an output means for outputting a matched character region or the first image comprising the matched character region,
- wherein said character region detecting means extracts equi-luminance pixel strings each of which has a length equal to or longer than a pre-designated length and has a luminance difference from a background within a pre-designated range.

14. The apparatus for searching character string image in an image, as claimed in claim 13, wherein said output means outputs the character regions in the descending order of the level of similarity obtained by the feature matching means.

15. An apparatus for searching character string images in an image having separate characters, comprising:
- a means for providing a first image,
- a means for detecting a character region from the frame of the first image on the basis of its shape,
- a means for extracting a first image feature of the character region, said first image feature containing image sub-features of a character string,
- an input means for entering a desired character string by a user,
- a character image generating means for drawing a second image of the desired character string,
- a means extracting a second image feature from the second image, said second image feature containing image sub-features of said character string of interest,
- a feature matching means for matching the first image feature with the second image feature and determining a level of similarity therebetween without breaking down the first and second image features per character into separate characters, and
- an output means for outputting a matched character region or the first image comprising the matched character region,
- wherein both the first image feature and the second image feature to be extracted are one-dimensional feature strings whose numbers of edges in a vertical direction are obtained by binarizing luminance of each pixel and counting numbers of luminance changes in the character regions, when the character strings are arrayed horizontally, and said feature matching means performs elastic matching of the one-dimensional feature strings both of which constitute the first image feature and the second image feature.

16. The apparatus for searching character string image in an image, as claimed in claim 15, wherein said output means outputs the character regions in the descending order of the level of similarity obtained by the feature matching means.

17. A program stored on a computer readable medium for processing of character search in an image having separate characters comprising:
- a module for providing a first image,
- a module for detecting a character region from the frame of the first image on the basis of its shape,
- a module for extracting a first image feature of the character region, said first image feature containing image sub-features of a character string,
- a module for receiving an input of a desired character string input by a user,
- a module for drawing a second image of the input character string,
- a module for extracting a second image feature from the second image, said second image feature containing image sub-features of said character string of interest,
- a module for matching the first image feature with the second image feature and determining a level of similarity therebetween without breaking down the first and second image features per character into separate characters,
- a module for outputting the character region containing the input character string in respect of which the level of similarity has been determined, and
- a module for removing line border blurring by correcting a border pixel luminance value into a maximum or minimum luminance value of adjacent pixels,
- wherein the module for detecting said character region includes extracting lines with a width in a specific range and extracting a concentrated region on the extracted lines as said character region.

18. The program as claimed in claim 17, wherein the line width is decided by a number of pixels with a luminance within a specific range or of equi-luminance.

19. The program as claimed in claim 18, wherein the line width is taken in vertical and horizontal directions.

20. The program as claim in claim 19, wherein the concentrated region is decided by projections of the lines in the vertical and horizontal directions.

21. The program as claimed in claim 17, wherein the module for detecting said character region extracts a character image feature string along one dimension of the character region or extracts the character image of interest by counting a number of edges with a predetermined luminance change.

22. The program as claimed in claim 17, further comprising a module for removing non-character background in the image by outlining the character region with a rectangle box having a sufficient margin, then removing pixels outside of the rectangle box, and wherein the module for outputting outputs the character region with the rectangle box.

* * * * *